United States Patent [19]

Kobayashi

[11] Patent Number: 4,524,584
[45] Date of Patent: Jun. 25, 1985

[54] BRAKE BOOSTER

[75] Inventor: Michio Kobayashi, Higashimatsuyama, Japan

[73] Assignee: Jidosha Kiki Co., Ltd., Tokyo, Japan

[21] Appl. No.: 531,554

[22] Filed: Sep. 12, 1983

[30] Foreign Application Priority Data

Sep. 22, 1982 [JP] Japan .................. 57-165604
Sep. 27, 1982 [JP] Japan .................. 57-167851

[51] Int. Cl.³ .................................................. B60T 13/00
[52] U.S. Cl. ...................................... 60/554; 60/547.1; 60/562; 91/369 A
[58] Field of Search ............ 60/547.1, 562, 552, 60/553, 554; 91/369 A, 376 R

[56] References Cited

U.S. PATENT DOCUMENTS

| 2,900,962 | 8/1959 | Ingres | 60/547.1 |
| 2,929,215 | 3/1960 | Stelzer | 60/552 |
| 2,929,216 | 3/1960 | Stelzer | 60/553 |
| 3,564,849 | 2/1971 | Huruta et al. | 60/553 |
| 3,893,379 | 7/1975 | Cripe et al. | 60/547.1 |
| 4,400,943 | 8/1983 | Belart | 60/547.1 |
| 4,423,597 | 1/1984 | Spielmann | 60/562 X |

FOREIGN PATENT DOCUMENTS

| 0045231 | 2/1982 | European Pat. Off. | 60/547.1 |
| 2073345 | 10/1981 | United Kingdom | 60/547.1 |

Primary Examiner—Robert E. Garrett
Assistant Examiner—John M. Husar
Attorney, Agent, or Firm—Flynn, Thiel, Boutell & Tanis

[57] ABSTRACT

A brake booster includes a master cylinder which is disposed rearwardly of a booster mechanism including a power piston, or toward a brake pedal. A valve mechanism which mechanically cooperates with an input shaft to produce a fluid pressure differential across the power piston includes a first valve seat formed on a valve body defined by a shank portion of the power piston, a second valve seat formed on the input shaft, and a valve head adapted to seat upon the first and the second valve seat in a direction opposite from the direction which is utilized in a conventional brake booster, or in a direction from the front side of the power piston. The valve mechanism is supplied with a fluid pressure from the front side of the power piston, thereby simplifying the construction of a brake booster of the type described.

10 Claims, 3 Drawing Figures

BRAKE BOOSTER

FIELD OF THE INVENTION

The invention relates to a brake booster, and more particularly, to such booster of the type including a booster mechanism having a power piston in which a master cylinder is disposed on the rear side thereof or toward a brake pedal.

DESCRIPTION OF THE PRIOR ART

A conventional brake booster includes a booster mechanism having a master cylinder connected to the front side thereof and having a shell which is mounted on a stationary bulkhead. A valve mechanism associated with such brake booster for controlling the opening and closing of flow paths for a fluid in accordance with a traversing motion of an input shaft may be constructed as a simple arrangement of single valve, double seat type while allowing a simplified arrangement for flow paths. Accordingly, such brake booster finds an extensive application, but because the shell of the booster requires a rigidity which is sufficient to carry a master cylinder, a reduction in the weight of the brake booster as by reducing the thickness of the wall of the shell has been limited.

By contrast, a brake booster having a master cylinder which is disposed rearwardly of a booster mechanism permits the master cylinder to be directly mounted on the stationary bulkhead, which is advantageous in reducing the weight of the booster since it is only necessary that the shell has a rigidity sufficient to withstand fluid pressures. However, the reversed arrangement of the brake booster and the master cylinder presents a difficulty if one desires a valve mechanism of single valve, double seat type, as used in a conventional brake booster, to be directly used.

Specifically, if a valve mechanism of single valve, double seat type is directly used, the reversed disposition of the master cylinder with respect to the booster mechanism requires a reversed disposition of the valve mechanism. Since the valve mechanism is arranged so that an output direction of an output shaft is in the same direction as the direction in which an input shaft is depressed, the depression of a brake pedal must be reversed in direction as by linkage for transmission to the valve mechanism, thus causing a complex input arrangement. If, on the contrary, the valve mechanism of single valve, double seat type is disposed in the same orientation as in a conventional brake booster, there must be formed a chamber for introducing the atmosphere or a compressed air between the master cylinder and the booster mechanism. The formation of such chamber and paths leading thereto cause an increased size of the brake booster, destroying the advantage which might be gained by the brake booster of this type.

To accommodate for this, a valve mechanism is frequently employed in which an output in the opposite direction is obtained in response to the depression of the brake pedal. However, such valve mechanism disadvantageously involves a complex arrangement and flow paths.

It will also be noted that a brake booster requires a reaction transmitting mechanism which transmits a reaction force to be transmitted to an operator in accordance with an output from the brake booster. In a conventional design, such reaction mechanism comprises a resilient reaction disc, an input shaft and a valve body disposed in opposing relationship with one end face of the reaction disc, and an output shaft disposed in opposing relationship with the other end face of the disc. A thrust applied to a power piston is transmitted to the output shaft through the valve body and the reaction disc for effecting a braking action while transmitting a brake reaction, which is applied to the output shaft, to the input shaft through the reaction disc.

In a brake booster in which a master cylinder is disposed rearwardly of a booster mechanism, it is necessary to have both an input and an output shaft extending through the master cylinder, so that the output shaft is normally formed as a hollow shaft through which the input shaft slidably extends, with the outer output shaft being connected to the piston of the master cylinder.

However when the valve mechanism of single valve, double seat type is used together with the reaction mechanism as mentioned above, a feature of the valve mechanism which requires the input shaft extending through the valve body necessitates that the input shaft be in surrounding relationship with the output shaft. Accordingly, the interconnection between the output shaft and the piston of the master cylinder is achieved by providing a radial projection on the end of the output shaft which extends through a slit formed in the input shaft to the exterior thereof, with the projection being connected to the piston. It will be seen that the design of a radial projection is adverse in consideration of the strength, and since a multiplied, increased output is produced on the output shaft, the projection must have a sufficient thickness to secure the required strength, resulting in an increased size and weight of the master cylinder.

SUMMARY OF THE INVENTION

It is an object of the invention to provide a brake booster in which a master cylinder is disposed rearwardly of a booster mechanism and which permits a valve mechanism of a simple construction such as that of single valve, double seat type to be used without involving a complication in the arrangement of the remainder as experienced in the prior art, thus allowing a reduction in the weight of the overall brake booster.

According to the invention, a valve mechanism of single valve, double seat type comprises a first valve seat formed on a valve body, a second valve seat formed on an input shaft, and a valve head which seats on the first and the second valve seat from the front side of the power piston, which is opposite in direction from a conventional valve mechanism of single valve, double seat type. A fluid pressure is applied to the valve mechanism from the front side of the power piston.

With this arrangement, there is obtained a brake booster in which a master cylinder is disposed rearwardly of a booster mechanism and which permits a valve mechanism of single valve, double seat type to be used while allowing a brake pedal to be depressed in the same direction as in conventional brake boosters. The elimination of the need for the provision of a path around the master cylinder for supplying the fluid pressure contributes to a further reduction in the weight of the brake booster.

It is another object of the invention to provide a brake booster utilizing a simplified interconnection between an output shaft and a master cylinder, allowing a further reduction in the size and weight of the brake booster.

With the valve mechanism described above, by allowing the valve head to be seated on the first and the second valve seat from the front side of the power piston, a reversed fitting relationship between the input and the output shaft is facilitated. By fitting the output shaft around the outer periphery of the input shaft, a piston associated with the master cylinder can be directly formed on the output shaft, providing a construction of an increased strength for the output shaft assembly which produces an increased force, thus allowing a reduction in the weight thereof.

Above and other objects, features and advantages of the invention will become apparent from a subsequent description of the invention with respect to embodiments thereof with reference to the drawings.

DETAILED DESCRIPTION OF THE EMBODIMENTS

Figure 1:
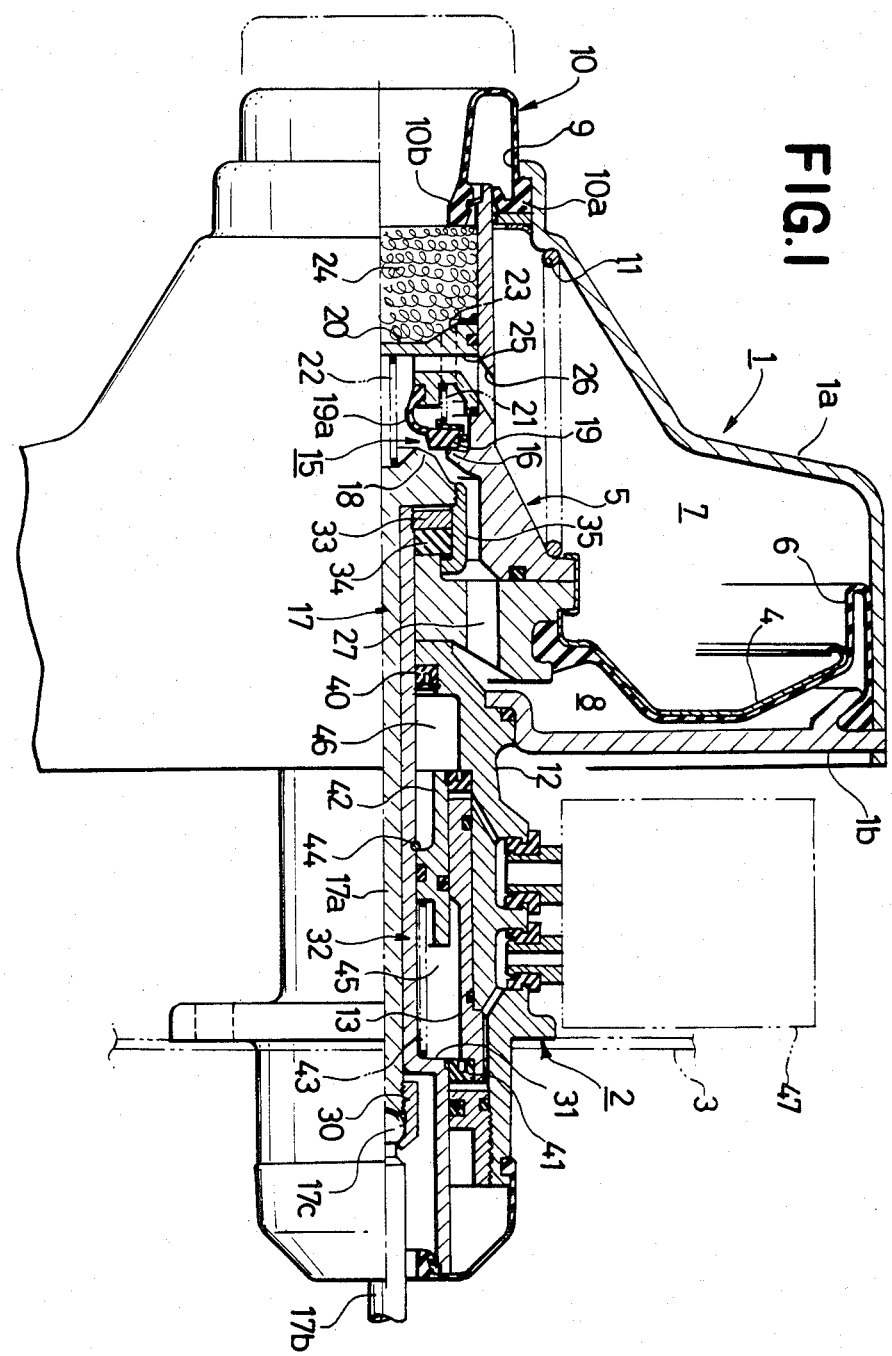
FIG. 1 is a longitudinal section of the upper one-half of a booster according to one embodiment of the invention.

Referring to the drawings, several embodiments of the invention will now be described. Initially referring to FIG. 1, there is shown a shell 1 including a front shell 1a and a rear shell 1b. A master cylinder 2 has its front end connected to a shank portion or a shaft receiving portion of the rear shell 1b and its other end secured to a stationary bulkhead 3. A power piston 4 is integral with a valve body 5 which is disposed within the shell 1 so as to be reciprocable along the axis of the shell 1. The power piston 4 is associated with a diaphragm 6, and the combination of the valve body 5, the power piston 4 and the diaphragm 6 divides the interior of the shell 1 into a constant pressure chamber 7 and a variable pressure chamber 8, which are located toward the front and the rear shell 1a, 1b, respectively.

The valve body 5 is generally cylindrical in configuration and has its front end extending externally through an opening 9 formed in the shank portion of the front shell 1a with a hermetic seal being maintained by the base portion 10a of a seal member 10 which is received in the opening. The seal member 10 has a tip portion 10b which is folded back, intermediate its length, to bear against the front end of the valve body 5. In this manner, the seal member 10 serves as a dust cover for a slidable contact between the valve body 5 and the base portion 10a. A return spring 11 is disposed between the front seal 1a and the valve body 5 for normally urging the latter into its inoperative position shown, in which the valve body 5 abuts against the housing 12 of the master cylinder 2.

A valve mechanism 15 is housed within the valve body 5 for switching a fluid circuit. Specifically, the valve mechanism 15 comprises an annular, first valve seat 16 formed around the internal peripheral surface of the valve body 5, a second valve seat 18 formed radially inward from the first valve seat 16 and formed on the tip end of an input shaft 17, and a valve head 19 which is adapted to be seated on each of the valve seats 16, 18 from the front side, as viewed in the direction of operation of the power piston 4, or from the left-hand side as viewed in FIG. 1. In its inoperative condition shown, the valve head 19 seats upon the first valve seat 16 under the resilience of a spring 21 which is interposed between the head 19 and a closure member 20 which closes the axial opening of the valve body 5. Another spring 22 is interposed between the closure member 20 and the input shaft 17 for maintaining the second valve seat 18 formed on the latter to be spaced from the valve head 19 as the latter seats upon the first valve seat 16.

Along its inner periphery, the valve head 19 is formed with a cylindrical seal 19a which is connected to the closure member 20, thereby defining a space by means of the outer periphery of the cylindrical seal 19a, the closure member 20 and the seal formed between the valve head 19 and the first valve seat 16. The space communicates with the atmosphere through a plurality of axial passages 23 formed in the closure member 20 and through a plurality of filters 24 disposed between the closure member 20 and the tip portion 10b of the seal member 10. On the other hand, the inner periphery of the cylindrical seal 19a, the closure member 20, and input shaft 17 and the seal formed between the second valve seat 18 and the valve head 19 define another space, which communicates with the constant pressure chamber 7 through a plurality of radial passages 25 formed in the closure member 20 so as to avoid communication with the axial passages 23 formed therein and through a passageway 26 formed in the valve body 5. A further space formed between the seal formed between the valve head 19 and the first valve seat 16 and the seal between the valve head 19 and the second valve seat 18 communicates with the variable pressure chamber 8 through an axial passageway 27 formed in the valve body 5. The input shaft 17 comprises a first input shaft section 17a and a second input shaft section 17b, with the second valve seat 18 being formed on the front end of the first input shaft section 17a. The first input shaft section 17a slidably extends through the shank portion of the housing 12 for the master cylinder 2 and has its rear end pivotally connected with a spherical portion 17c, located on the front end of the second input shaft section 17b, by means of a fastener 30. The rear end of the second input shaft section 17b is connected to a brake pedal, not shown. An output shaft 32 is slidably disposed in surrounding relationship with the first input shaft section 17a for transmitting a thrust from the power piston 4 to the piston 31 of the master cylinder 2. In the present embodiment, the output shaft 32 and the piston 31 are formed as an integral stepped hollow tube.

The front end of the output shaft 32 extends to the vicinity of the second valve seat 18 and threadably carries a nut member 33 with a reaction disc 34 disposed on its backside so that the thrust applied to the power piston 4 and the valve body 5 is received by the combination of the reaction disc 34 and the nut member 33. As shown, a cylindrical fastener 35 threadably engages the outer periphery of the input shaft 17 in the region of the second valve seat 18 for slidably receiving the nut member 33 and the reaction disc 34 therein. The rear end of the fastener 35 is curved inwardly to be located behind the reaction disc 34 so that a reaction force from the disc 34 can be transmitted to the brake pedal through the fastener 35 and the input shaft 17.

The output shaft 32 slidably extends through the shank portion of the housing 12 in a liquid tight manner which is maintained by a pair of seal members 40, 41 disposed on the housing 12 and a sleeve 13, respectively. In the embodiment shown, the master cylinder 2 is constructed as a two circuit type, with the piston 31 which is integral with the output shaft 32 serving as a primary piston. A secondary piston 42 is slidably fitted in a space between the output shaft 32 and the sleeve 13 while maintaining a liquid tight relationship. A spring 43 disposed between the pistons 31 and 42 normally urges the piston 42 into abutment against a stop ring 44 mounted on the output shaft 32.

The master cylinder 2 can be similarly constructed as a conventional master cylinder of two circuit type except for the construction relating to the pistons 31, 42, and therefore its construction will not be specifically described. In FIG. 1, a numeral 45 represents the pressure chamber of one sub-circuit, 46 the pressure chamber of the other sub-circuit and 47 a reservoir.

With the described arrangement, in its inoperative condition, both the power piston 4 and the valve body 5 are urged by the return spring 11 to abut against the housing 12 of the master cylinder 2, and the input shaft 17 is urged by the spring 22 to the right together with the output shaft 32 and remains stationary with the reaction disc 34 lightly compressed against the valve body 5 which remains at rest by abutment against the housing 12. Under this condition, the valve head 19 seats upon the first valve seat 16 to interrupt the communication between the variable pressure chamber 8 and the atmosphere. Since the valve head 19 is remote from the second valve seat 18, a communication is allowed between the variable and the constant pressure chambers 8, 7. Accordingly, a negative pressure which is introduced into the constant pressure chamber 7 through an inlet (not shown) formed in the front shell 1a is also introduced into the variable pressure chamber 8 through the passageway 26, the passages 25, the clearance between the valve head 19 and the second valve seat 18 and the passageway 27, thus producing no pressure differential across the power piston 4.

When the brake pedal is depressed to move the input shaft 17 to the left under the condition described, the second valve seat 18 engages the valve head 19 to interrupt the communication between the both pressure chambers 7, 8, and the continued movement of the input shaft 17 to the left causes the valve head 19 to be moved away from the first valve seat 16. Thereupon, the atmosphere is introduced into the variable pressure chamber 8 through the filters 24, the passages 23, the clearance between the valve head 19 and the first valve seat 16 and the passageway 27, producing a pressure differential across the power piston 4 and the valve body 5, and causing them to move to the left against the resilience of the return spring 11.

As the valve body 5 moves to the left, a thrust thereof is transmitted through the reaction disc 34, the nut member 33 and the output shaft 32 to the primary piston 31 of the master cylinder 2. Accordingly, the piston 31 moves to the left to produce a braking liquid pressure within the pressure chamber 45, which in turn causes the secondary piston 42 to move to the left to produce a braking liquid pressure within the pressure chamber 46. The braking liquid pressure produced within the respective pressure chambers 45, 46 are supplied to a wheel cylinder, not shown, to provide a braking action as is well known in the art. In the meantime, a brake reaction force is transmitted from the reaction disc 34 through the fastener 35 and the input shaft 17 to the brake pedal.

If the brake pedal is now released, the valve mechanism 15 switches to the condition shown, thus returning to its inoperative condition initially mentioned. It will be seen that during such return process, the valve body 5 is urged to the right by the action of the atmospheric pressure. A return spring of a reduced resilience, as compared with one used in the conventional practice, and hence of a reduced weight, can be used for the return spring 11. Under some situations, such return spring 11 can be omitted, allowing a corresponding reduction in the weight of the brake booster.

In the present embodiment, a valve mechanism of single valve, double seat type and having a simple construction is employed while allowing the brake pedal to be depressed in the same direction as used in a conventional brake booster, thus further facilitating the achievement of a reduced weight for the brake booster.

The formation of the piston 31 of the master cylinder 2 in an integral manner with the output shaft 32 eliminates the need for any fastening means and associated seals between the output shaft 32 and the piston 31, thus simplifying the construction. Even if they are formed separately, a fastening means between the output shaft 32 and the piston 31 would still provide a simpler, but more rigid connection therebetween, as compared with the conventional arrangement in which the output shaft is disposed inside the input shaft, thus allowing a reduction in the size and weight of such connection.

Figure 2:
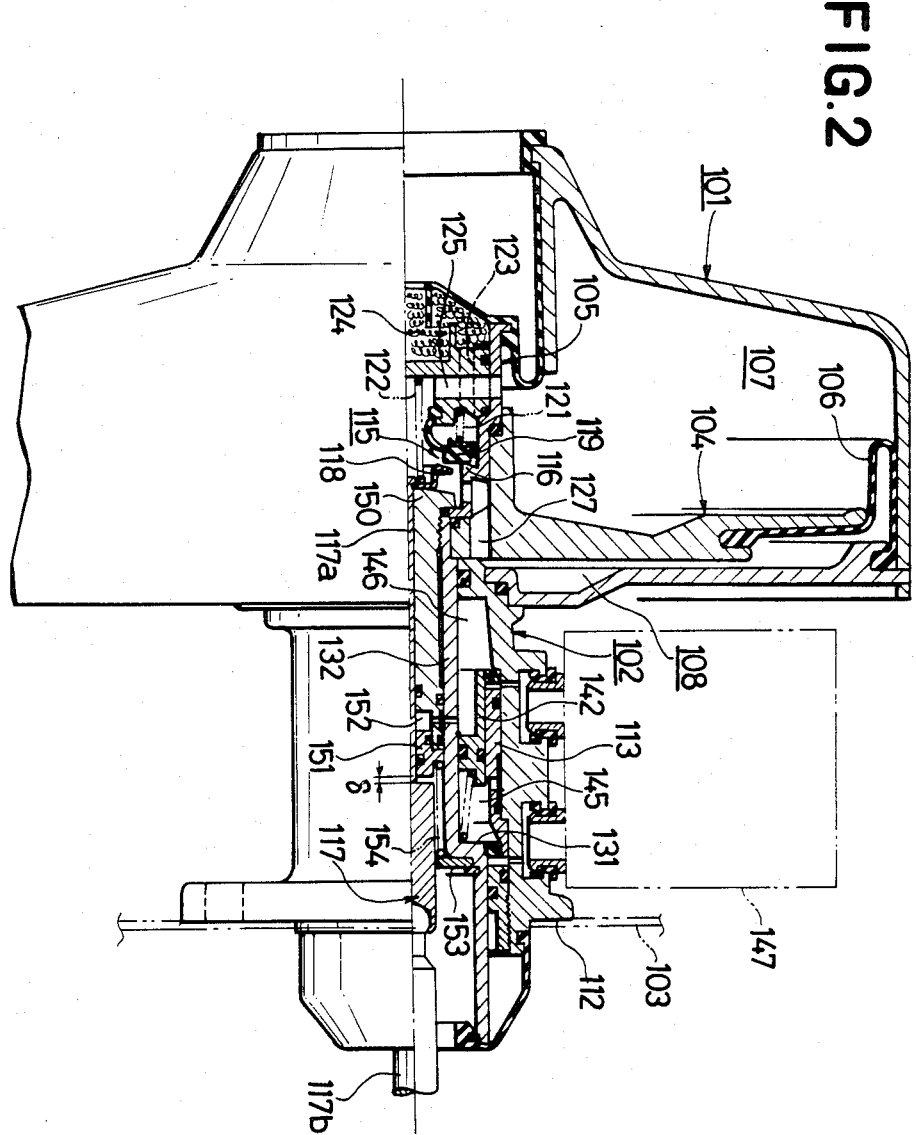
FIG. 2 is a similar cross section of another embodiment of the invention.

FIG. 2 shows another embodiment of the invention, which is primarily distinguished from the first mentioned embodiment in the arrangement of a reaction mechanism, which causes a braking liquid pressure produced to be transmitted to the brake pedal as a reaction force.

In the present embodiment, a substantially cup-shaped valve body 105 is disposed on the front end of the shank portion of a power piston 104, and is integrally connected therewith by holding the valve body and the power piston between a step formed on the front end of an output shaft 132 and the head of a cylindrical bolt 150 which threadably engages the shank portion of the output shaft 132. An input shaft 117 comprises a first input shaft section 117a which slidably extends through the cylindrical bolt 150, which a second valve seat 118 formed on its front and which forms a valve mechanism 115. A reaction transmitting member 151 is slidably fitted into the space between the internal surface of the output shaft 132 and its integral cylindrical bolt 150 and the external surface of the first input shaft section 117a in a liquid tight manner, defining a reaction chamber 152 disposed forwardly of the reaction transmitting member 151 which communicates with a pressure chamber 146 within a master cylinder 102. A spring 154 is disposed between the member 151 and a retainer 153 which is mounted on the output shaft 132 for normally urging the reaction transmitting member 151 into abutment against the cylindrical bolt 150. Under this condition, a clearance δ is formed between the member 151 and the end face of a portion of the shaft section 117a which is formed with an increased diameter at the rear end thereof.

In other respects, the arrangement is substantially similar to that mentioned in connection with the first embodiment, and accordingly, equivalent or corresponding parts are designated by like reference numerals are used in FIG. 1, to which a figure 100 is added. It is noted that a return spring is omitted in this embodiment.

In operation, when a brake pedal is depressed to move the input shaft 117 to the left, the valve mechanism 115 is switched in the similar manner as before, introducing the atmosphere into a variable pressure chamber 108. This causes the power piston 104, the valve body 105, the output shaft 132 and the piston 131 to move to the left, producing a braking liquid pressure within a pressure chamber 145 which causes a piston 142 to move to the left, thereby producing a braking liquid pressure within the pressure chamber 146, which pressure is then introduced into the reaction chamber 152.

During the initial phase of a braking operation when the braking liquid pressure introduced into the reaction chamber 152 is at its low level, the reaction transmitting member 151 is maintained in abutment against the cylindrical bolt 150 under the resilience of the spring 154, and the clearance δ is maintained between the member 151 and the end face of the large diameter portion of the first input shaft section 117a. Consequently, the braking liquid pressure is not transmitted to the input shaft 117 as a reaction force. However, as the braking liquid pressure within the reaction chamber 152 rises to cause the reaction transmitting member 151 to abut against the end face of the large diameter portion of the first input shaft section 117a against the resilience of the spring 154, the braking liquid pressure begins to be transmitted to the input shaft 117 as a reaction force.

Figure 3:
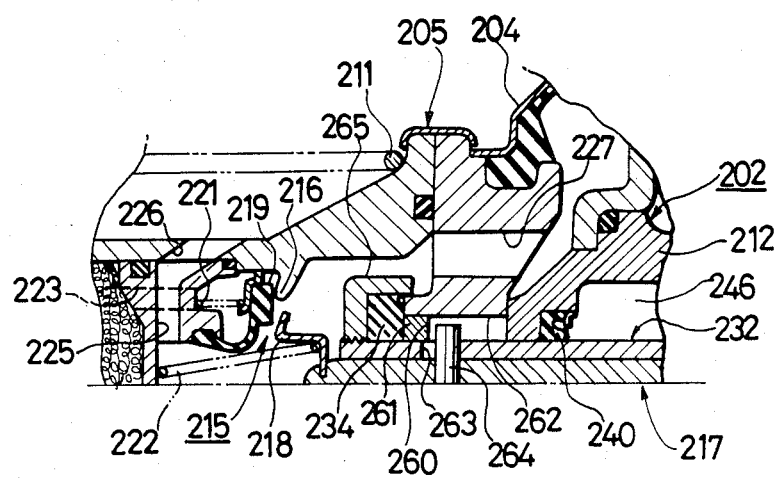
FIG. 3 is a fragmentary cross section of a further embodiment of the invention.

FIG. 3 shows an essential part of a further embodiment of the invention. In this embodiment, an arrangement is made to provide a mechanical interlocking between an input shaft 217 and a reaction disc 234 from the inside. Specifically, a valve body 205 has a shank portion in which is formed an annular groove 260, in which an annular member 261 is slidably fitted. Both the front end face of the annular member 261 and the end face of a portion of the valve body 205 which is located around the annular member 216 face the rear end face of the reaction disc 234. A pair of vertically aligned, axially extending grooves 262 are formed in the valve body 205 in communication with the annular groove 260, and a pair of vertically aligned, axially extending slits 263 are formed in an output shaft 232. A pin 264 is fitted into and secured to the input shaft 217 and has its opposite ends extending through the respective slits 263 so as to be located in opposing relationship with the rear end face of the annular member 261. A cup-shaped member 265 is mounted on the front end of the output shaft 232 to receive the reaction disc 234 therein, with the inner wall surface of the cup-shaped member 265 facing the front end of the reaction disc 234. A second valve seat 218 is formed separately and is mounted on the front end of the input shaft 217.

In other respects, the arrangement is substantially similar to the embodiment shown in FIG. 1, and equivalent or corresponding parts are designated by like reference numerals as used in FIG. 1, to which a figure 200 is added.

In this embodiment, a reaction force is transmitted from the output shaft 232 through the reaction disc 234, the annular member 261 and the pin 264 to the input shaft 217. Also the pin 264 interconnects the input shaft 217 and the annular member 261 in this embodiment, but since the input shaft 217 is not subject to an amplified force, the pin does not require an increased strength as might be needed when providing a projection such as a pin on an output shaft in a conventional arrangement, thus allowing a reduction in the size and weight of the arrangement.

While the invention has been specifically shown and described above in connection with several embodiments thereof, it should be understood that a number of changes, modifications and substitutions will readily occur to one skilled in the art without departing from the scope and sprit of the invention. Hence it is intended that the scope of the invention be solely defined by the appended claims.

What is claimed is:

1. A brake booster comprising a power piston having a shank portion, said power piston being slidably disposed within a shell including a front shell portion and a rear shell portion, the power piston having front and rear sides facing toward the front and rear shell portions respectively, a valve mechanism received within a valve body which is defined by the shank portion of the power piston, a constant pressure chamber and a variable pressure chamber defined fowardly and rearwardly respectively, of the power piston as viewed in the direction of operation thereof, a master cylinder connected to the rear shell adjacent to the variable pressure chamber, an input shaft extending through the master cylinder for cooperation with the valve mechanism, a supply passage for supplying a fluid pressure to the valve mechanism through the front side of the power piston, and an output shaft for providing a mechanical interconnection between the power piston and the piston of the master cylinder, wherein the valve mechanism includes a first valve seat formed on the valve body, a second valve set formed on the input shaft and a valve head urged in a direction from the front side toward the rear side of the power piston to seat against the first and second valve seats and thereby respectively create a seal between the valve head and first seat and a seal between the valve head and second seat, a region outside said seal between the valve head and the first valve seat being disposed in communication with the supply passage, a region inside said seal between the valve head and the second valve seat and inward of the first valve seat being disposed in communication with the constant pressure chamber, and a region between both said seals being disposed in communication with the variable pressure chamber.

2. A brake booster according to claim 1 in which the valve body is disposed for reciprocating motion while maintaining a hermetic seal of the constant pressure chamber by means of a seal member which is disposed between the front end of the valve body and the front shell, the front end of the valve body extending to the outside of the front shell, the supply passage being formed in the valve body in communication to an annular chamber bounded by the valve head and valve body from a source of fluid pressure located outside the front shell.

3. A brake booster according to claim 1 wherein the first and second valve seats face generally forward, said valve head facing generally rearward for seating against said first and second valve seats, said valve head being resiliently urged rearward with respect to said valve body, said input shaft having a rear portion actuable forwardly by a brake pedal or the like actuator for causing the brake booster to actuate said master cylinder, said fluid pressure exceeding said constant pressure, said valve head opposing said first seat on said valve body to control application of said fluid pressure to said variable pressure chamber and opposing said second valve seat on said input shaft to control connection of said constant pressure chamber to said variable pressure chamber.

4. A brake booster according to claim 1 in which the output shaft is slidably disposed in surrounding relationship with the input shaft, the output shaft comprising front and rear portions respectively closely and loosely surrounding said input shaft and connected by a radial step separating a chamber of the master cylinder from an annular open space to the rear of said step.

5. A brake booster comprising a power piston having a shank portion, said power piston being slidably disposed within a shell including a front shell portion and a rear shell portion, a valve mechanism received within a valve body which is defined by the shank portion of the power piston, a constant pressure chamber and a variable pressure chamber defined forwardly and rearwardly respectively, of the power piston as viewed in the direction of operation thereof, a master cylinder connected to the rear shell adjacent to the variable pressure chamber, an input shaft extending through the master cylinder for cooperation with the valve mechanism, a supply passage for supplying a fluid pressure to the valve mechanism through the front side of the power piston, and an output shaft for providing a mechanical inteconnection between the power piston and the piston of the master cylinder, wherein the valve mechanism includes a first valve seat formed on the valve body, a second valve seat formed on the input shaft and a valve head urged in a direction from the front side toward the rear side of the power piston to seat against the first and second valve seats, and in which the output shaft is slidably disposed in surrounding relationship with the input shaft, the output shaft comprising front and rear portions respectively closely and loosely surrounding said input shaft and connected by a radial step separating a chamber of the master cylinder from an annular open space to the rear of said step, and means defining an axial lost motion connection between said input and output shafts and having at least a part thereof located in said open space to the rear of said radial step.

6. A brake booster comprising a power piston having a shank portion, said power piston being slidably disposed within a shell including a front shell portion and a rear shell portion, a valve mechanism received within a valve body which is defined by the shank portion of the power piston, a constant pressure chamber and a variable pressure chamber defined forwardly and rearwardly respectively, of the power piston as viewed in the direction of operation thereof, a master cylinder connected to the rear shell adjacent to the variable pressure chamber, an input shaft extending through the master cylinder for cooperation with the valve mechanism, a supply passage for supplying a fluid pressure to the valve mechanism through the front side of the power piston, and an output shaft for providing a mechanical interconnection between the power piston and the piston of the master cylinder, wherein the valve mechanism includes a first valve seat formed on the valve body, a second valve seat formed on the input shaft and a valve head urged in a direction from the front side toward the rear side of the power piston to seat against the first and second valve seats, and in which the output shaft includes a radially outwardly stepped rear portion defining a piston of the master cylinder, a reaction chamber being defined within the output shaft and disposed in communication with a forward pressure chamber of the master cylinder, the master cylinder having a rearward pressure chamber separated from said forward chamber by a secondary piston slidable on said output shaft and substantially radially aligned with said reaction chamber, a reaction transmitting member slidably disposed within the reaction chamber for transmitting a reaction force to the input shaft by abutment therewith, springs extending forward from the radial step of the output shaft and radially sandwiching the output shaft therebetween for forward biasing said secondary piston and reaction member.

7. A brake booster comprising a power piston having a shank portion, said power piston being slidably disposed within a shell, a valve mechanism received within a valve body which is defined by the shank portion of the power piston, a reaction disc housed within the valve body, a constant pressure chamber and a variable pressure chamber defined forwardly and rearwardly, respectively, of the power piston as viewed in the direction of operation thereof, a master cylinder connected to a portion of the shell which defines the variable pressure chamber, said master cylinder having a piston, an input shaft extending through the master cylinder for cooperation with the valve mechanism, a supply passage for supplying a fluid pressure to the valve mechanism in a direction from the front side of the power piston, and an output shaft for providing a mechanical interconnection between the power piston and the piston of the master cylinder, the valve mechanism including a first valve seat formed on the valve body, a second valve seat formed on the input shaft and a valve head urged in a direction from the front side to the rear side of the power piston to seat upon the first valve seat and the second valve seat, the reaction disc having an end face which is located toward a brake pedal, means on said input shaft defining an end face, said reaction disc end face being disposed in opposing relationship with an end face of the valve body and said end face of said means on the input shaft, the opposite end face of the reaction disc being disposed in opposing relationship with an end face of the output shaft, the output shaft being slidably fitted over and in surrounding relationship with the input shaft, the piston of the master cylinder being formed on the output shaft, in which the output shaft comprises a stepped hollow tube, with the step defining the piston of the master cylinder.

8. A brake booster according to claim 7 wherein the first and second valve seats face generally forward, said valve head facing generally rearward for seating against said first and second valve seats, said valve head being resiliently urged rearward with respect to said valve body, said input shaft having a rear portion actuable forwardly by a brake pedal or the like actuator for causing the brake booster to actuate said master cylinder, said fluid pressure exceeding said constant pressure, said valve head opposing said first seat on said valve body to control application of said fluid pressure to said variable pressure chamber and opposing said second valve seat on said input shaft to control connection of said constant pressure chamber to said variable pressure chamber.

9. A brake booster comprising a power piston having a shaft portion, said power piston being slidably disposed within a shell, a valve mechanism received within a valve body which is defined by the shank portion of the power piston, a reaction disc housed within the valve body, a constant pressure chamber and a variable pressure chamber defined forwardly and rearwardly, respectively, of the power piston as viewed in the direction of operation thereof, a master cylinder connection to a portion of the shell which defines the variable pressure chamber, said master cylinder having a piston, an input shaft extending through the master cylinder for cooperation with the valve mechanism, a supply passage for supplying a fluid pressure to the valve mechanism in a direction from the front side of the power piston, and an output shaft for providing a mechanical interconnection between the power piston and the piston of the master cylinder, the valve mechanism including a first valve seat formed on the valve body, a second valve seat formed on the input shaft and a valve head urged in a direction from the front side to the rear side of the power piston to seat upon the first valve seat and the second valve seat, the reaction disc having an end face which is located toward a brake pedal, means on said input shaft defining an end face, said reaction disc end face being disposed in opposing relationship with an end face of the valve body and said end face of said means on the input shaft, the opposite end face of the reaction disc being disposed in opposing relationship with an end face of the output shaft, the output shaft being slidably fitted over and in surrounding relationship with the input shaft, the piston of the master cylinder being formed on the output shaft, in which a forward portion of the input shaft includes a portion of an increased diameter, the second valve seat being formed forwardly of the portion of increased diameter, said end face on said means on said input shaft comprising an end face on a rear portion of a cylindrical fastener member, said fastener member being disposed rearwardly of the portion of an increased diameter, a forward portion of the output shaft including a portion of an increased diameter whih is slidably fitted inside the fastener member, the rear end face of the portion of an increased diameter of the output shaft being disposed in opposing relationship with the front end face of the reaction disc, the rear end face of said reaction disc being disposed in opposing relationship with said end face of the valve body in a radially inward area and in opposing relationship with said end face of said rear end portion of the fastener member in a radially outward area.

10. A brake booster comprising a power piston having a shank portion, said power piston being slidably disposed within a shell, a valve mechanism received within a valve body which is defined by the shank portion of the power piston, a reaction disc housed within the valve body, a constant pressure chamber and a variable pressure chamber defined forwardly and rearwardly, respectively, of the power piston as viewed in the direction of operation thereof, a master cylinder connected to a portion of the shell which defined the variable pressure chamber, said master cylinder having a piston, an input shaft extending through the master cylinder for cooperation with the valve mechanism, a supply passage for supplying a fluid pressure to the valve mechanism in a direction from the front side of the power piston, and an output shaft for providing a mechanical interconnection between the power piston and the piston of the master cylinder, the valve mechanism including a first valve seat formed on the valve body, a second valve seat formed on the input shaft and a valve head urged in a direction from the front side to the rear side of the power piston to seat upon the first valve seat and the second valve seat, the reaction disc having an end face which is located toward a brake pedal, means on said input shaft defining an end face, said reaction disc end face being disposed in opposing relationship with an end face of the valve body and said end face of said means on the input shaft, the opposite end face of the reaction disc being disposed in opposing relationship with an end face of the output shaft, the output shaft being slidably fitted over and in surrounding relationship with the input shaft, the piston of the master cylinder being formed on the output shaft, in which the output shaft is provided with a cup-shaped member on its front end for receiving the reaction disc therein, the rear end face of the reaction disc being disposed in opposing relationship with an end face of the valve body in a radially outward area and with an end face of an annular member slidably disposed in a radially inward area of the valve body, the rear end face of the annular member being engageable by a projection which extends through an axial slit formed in the output shaft and into an axial slot in the valve body for mechanical interlocking with the input shaft.

* * * * *

UNITED STATES PATENT AND TRADEMARK OFFICE
CERTIFICATE OF CORRECTION

PATENT NO. : 4 524 584
DATED : June 25, 1985
INVENTOR(S) : Michio Kobayashi

It is certified that error appears in the above-identified patent and that said Letters Patent is hereby corrected as shown below:

Column 11, line 33; change "whih" to ---which---.

Column 12, line 8; change "defined" to ---defines---.

Signed and Sealed this

Seventeenth Day of December 1985

[SEAL]

Attest:

DONALD J. QUIGG

Attesting Officer  Commissioner of Patents and Trademarks